Patented Feb. 28, 1933

1,899,215

UNITED STATES PATENT OFFICE.

HENRY B. SMITH AND STEWART J. CARROLL, OF ROCHESTER, NEW YORK, ASSIGNORS TO EASTMAN KODAK COMPANY, OF ROCHESTER, NEW YORK, A CORPORATION OF NEW YORK

CELLULOSE ACETATE COMPOSITION CONTAINING A BROMINATED DIPHENYL ETHER

No Drawing.   Application filed February 10, 1932.   Serial No. 592,183.

This invention relates to compositions of matter in which an organic ester of cellulose, such, for instance, as cellulose acetate, is combined or mixed with other substances, such as a compatible plasticizer, with or without a common solvent for both, and with or without other useful addition agents, so that the resulting product will have properties such as will make the composition highly advantageous for use in the plastic and analogous arts, such, for instance, as the manufacture of wrapping sheets or tissue, photographic film, artificial silk, varnishes or lacquers, and the like.

One object of this invention is to produce compositions of matter which may be made into permanently transparent, strong and flexible sheets or films of desired thinness which are substantially waterproof, are unaffected by ordinary photographic fluids and possess the desired properties of a support for sensitive photographic coatings. Another object of our invention is to produce compositions which will not injure, or be injured by, the substances or surfaces with which they are associated during manufacture. Another object is to produce cellulose acetate compositions of very low inflammability. Other objects will become apparent to those skilled in the art to which this invention pertains.

While cellulose acetate has been known for decades, it has also been known that to utilize it in the various plastic arts it is necessary to mix therewith such plasticizing or conditioning agents as triphenyl phosphate, monochlornaphthalene or the like. Certain of these and other addition agents are also added for the purpose of reducing the inflammability of the product. Plastic inducing agents, such as the higher alcohols and their esters, are sometimes also added. Similarly, addition compounds of various kinds have been employed to increase flexibility, transparency, toughness and other properties which will enhance the value of the resulting product. Addition products for the same or similar purposes are also added to cellulose acetate to prepare it for use in the other plastic arts, such as in the manufacture of lacquers, varnishes, artificial silk filaments and the like. While the plasticizers or other addition agents heretofore discovered have had their utility in the art, the increasing use to which cellulose acetate has been put and the increasing number of desirable properties required of cellulose acetate for most purposes have made the discovery of new and economical plasticizers or other addition agents a matter of considerable importance to the art. This has been a problem of some difficulty, since many of the nitrocellulose solvents are not solvents for cellulose acetate, and many substances which act as plasticizers for nitrocellulose are not sufficiently compatible with cellulose acetate to be used as plasticizers in cellulose acetate compositions.

We have discovered that valuable properties may be induced in and/or contributed to compositions containing organic esters of cellulose, such as cellulose acetate, by adding thereto as a plasticizing compound a brominated diphenyl ether, such as p-bromo diphenyl ether or 4:4'-dibromo diphenyl ether. Para-bromo diphenyl ether has the structural formula:

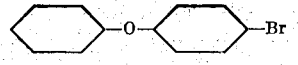

4:4'-dibromo diphenyl ether has the structural formula:

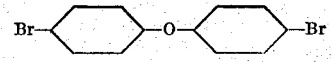

They are compatible with organic esters of cellulose, and particularly compatible with cellulose acetate in the percentages hereinafter given. The particularly useful properties which these plasticizers induce in or contribute to cellulosic compositions containing them are hereinafter enumerated.

4:4'-dibromo diphenyl ether has been described in the literature. p-bromo diphenyl ether may be prepared as follows: To a mixture of 1700 g. of diphenyl ether and 1000 g. of carbon tetrachloride in a 5-liter 3-necked flask provided with a stirrer and a reflux condenser, 1600 g. of bromine is added with stirring, over a period of about three hours. The carbon tetrachloride is then removed on the steam bath under suction, and the residue is fractionated under diminished pressure through a three-foot lagged column. After three fractionations, the fraction boiling at 167–168° C. at 15 mm. pressure is collected as p-bromo diphenyl ether.

In order that those skilled in this art may better understand our invention, we would state, by way of illustration, that for the manufacture of photographic film or other sheets, our new compositions of matter may be compounded as follows: 100 parts of acetone-soluble cellulose acetate, i. e. cellulose acetate containing from 36% to 42% acetyl radical, approximately, is dissolved with stirring at atmospheric temperature in 300 to 500 parts, preferably 400 parts, by weight, of acetone. To this solution may be added from 10 to 20 parts by weight of p-bromo diphenyl ether, or of 4:4'-dibromo diphenyl ether. Within the limits stated, the amount of plasticizer may be decreased or increased, depending upon whether it is desired to decrease or increase, respectively, the properties which this compound contributes to the finished product. The amount of solvent employed may also be increased or decreased, depending upon whether it is desired to have a more or less freely flowing composition, respectively.

Compositions of matter prepared as above described may be deposited upon any suitable film-forming surface to form films or sheets, in a manner well known to those skilled in the art. Films so produced have permanently brilliant transparency, and are quite tough and flexible. Films of cellulose acetate plasticized with p-bromo diphenyl ether and with 4:4'-dibromo diphenyl ether had an initial flexibility equal to that of film plasticized with a similar amount of monochlor-naphthalene, which has been regarded as one of the better plasticizers. Furthermore, film so plasticized maintains flexibility in a superior fashion. For instance, film plasticized with 20% (parts by weight based on the weight of the cellulose acetate) of p-bromo diphenyl ether maintained flexibility at 65° C. for 114 days, and film plasticized with 20% of 4:4'-dibromo diphenyl ether maintained flexibility at 65° C. for 170 days, whereas an unplasticized film became brittle in 30 days. This indicates that films so plasticized will withstand ordinary usage satisfactorily for many years. Films plasticized with our novel plasticizers have very low inflammability, five ignitions being necessary to burn a 3½ inch strip of film containing 20 parts by weight of 4:4'-dibromo diphenyl ether, and three ignitions being necessary to burn a similar strip of film containing 20 parts by weight of p-bromo diphenyl ether per 100 parts by weight of cellulose acetate.

Other similar solvents (instead of acetone) which are compatible with the cellulose acetate and our new plasticizers may also occur to those skilled in this art. In like manner these plasticizers may be compounded with other single organic esters of cellulose, such as cellulose propionate, butyrate and the like, or with mixed organic esters, such as cellulose aceto-stearate, cellulose aceto-propionate, or cellulose aceto-malate, a suitable solvent which will dissolve both the cellulose derivative and the plasticizer being employed.

Inasmuch as our above-described compositions of matter are useful in the production of films and sheets, it will be apparent that our new plasticizers may also be employed with advantage in the other branches of the plastic art. For instance, our above-described compositions of matter may be employed in the manufacture of artificial silk by the dry spinning method. With the proper coagulating bath they may also be employed for wet spinning. It may be desired to employ compositions of different viscosity or evaporation characteristics, but this is a mere matter of changing the solvent proportion or adding evaporation retardents or other high or medium-boiling constituents, as has been well known in the art for more than a decade. Our novel plasticizers may also be employed with advantage in connection with a number of the known lacquer and varnish formulæ with which they may be found to be compatible. In such cases the plasticizer is usually first put into solution with the cellulose derivative solution, and if non-solvents are added for the purpose of cheapening the composition, they are added only to such an extent as will not precipitate the derivative from solution. Other uses within the scope of our invention will also suggest themselves to those skilled in the art and are to be included within the scope of the claims appended hereto.

While we have described p-bromo diphenyl ether and 4:4'-dibromo diphenyl ether, it will be obvious that the isomers of these bromo compounds are also included within the scope of our invention.

What we claim as our invention and desire to be secured by Letters Patent of the United States is:

1. A composition of matter comprising an organic ester of cellulose and a brominated diphenyl ether.

2. A composition of matter comprising cellulose acetate and a brominated diphenyl ether.

3. A composition of matter comprising cellulose acetate and p-bromo diphenyl ether.

4. A composition of matter comprising cellulose acetate and 4:4'-dibromo diphenyl ether.

5. A composition of matter comprising 100 parts of cellulose acetate and about 10 to 20 parts, by weight, of a brominated diphenyl ether.

6 A relatively thin sheet comprising 100 parts of cellulose acetate and about 10 to 20 parts, by weight, of a brominated diphenyl ether.

Signed at Rochester, New York this 6th day of January, 1932.

HENRY B. SMITH.
STEWART J. CARROLL.